T. H. FLETCHER.

Pegging Machine.

No. 9,726. Reissued May 31, 1881.

Wm. Ittel.
John R. Snow.

Tristram H. Fletcher
by J. E. Maynadier
his atty.

N. PETERS, Photo-Lithographer, Washington, D. C.

UNITED STATES PATENT OFFICE.

TRISTRAM H. FLETCHER, OF HOLLIS, MAINE, ASSIGNOR OF ONE-HALF TO JOSHUA SUMNER HOLT, OF BOSTON, MASSACHUSETTS.

PEGGING-MACHINE.

SPECIFICATION forming part of Reissued Letters Patent No. 9,726, dated May 31, 1881.

Original No. 206,717, dated August 6, 1878. Application for reissue filed April 6, 1881.

*To all whom it may concern:*

Be it known that I, TRISTRAM H. FLETCHER, of Hollis, in the county of York and State of Maine, have invented certain new and useful Improvements in Pegging-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
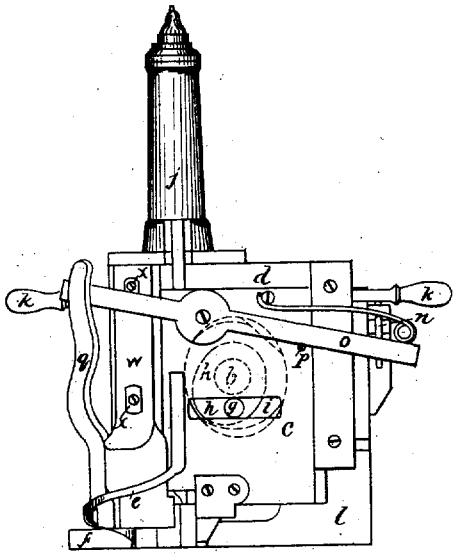
Figure 2:
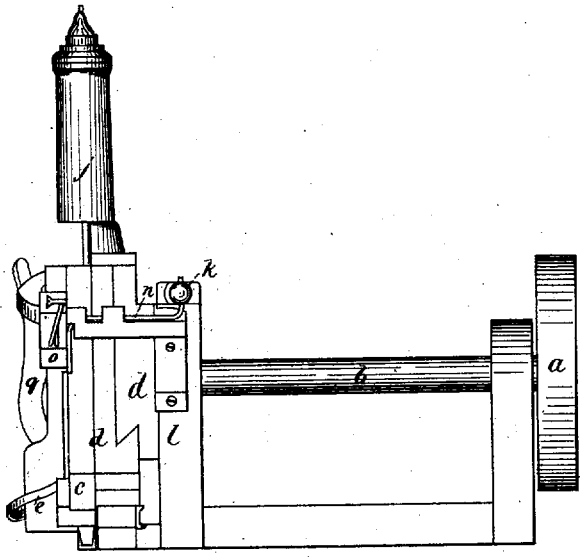
Figure 3:
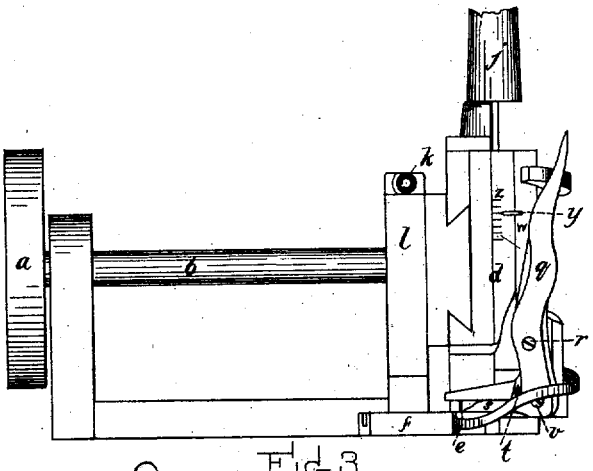
Figure 4:
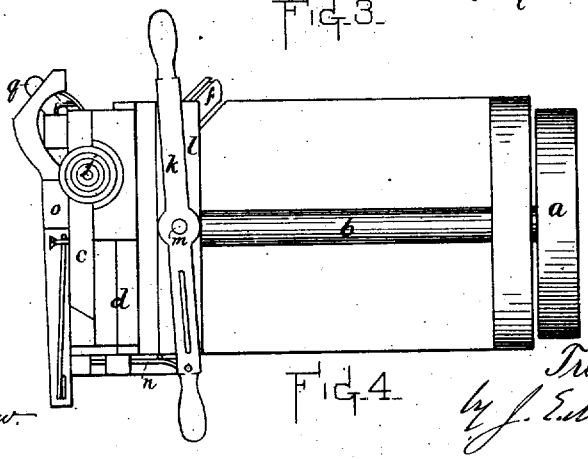

Figure 1 is an end elevation. Fig. 2 is a side elevation. Fig. 3 is another side elevation. Fig. 4 is a top plan.

Same letters show like parts.

The purpose of my invention is to produce a machine for pegging boots and shoes in which the length of the pegs can be shortened, as desired, during the operation of pegging while the machine is in operation and without stopping it.

It is well known that pegs of different lengths are used in different parts of the soles. The pegs are cut from ribbons, which are generally of uniform width. This fact obliges the workman to have coils of ribbons of different widths, and at different stages in the pegging process to take out one coil from the machine and substitute another. This involves both the necessity of having ribbons of various widths and also of stopping the machine to change the ribbons.

To obviate these objections I have invented a machine, portions of which are old, and these I will first enumerate.

The power-wheel *a*, shaft *b*, rising-and-falling plate *c*, and the horizontally-sliding block *d* are not new. The knife *e*, operated by the plate *c*, and working in the ribbon-box *f* to slice off the pegs from the ribbons, is also old. So, also, are the crank-pin *g* and the eccentric *h* to give the motions above described to the plate *c* and the block *d*. These are set on the shaft *b* and are rotated by it. The pin *g* works in the slot *i* and moves the plate *c* up and down. The eccentric *h* works in an aperture or box behind the plate *c*, and by pushing against the sides thereof gives the sidewise motion to the block *d*.

The apparatus for driving the pegs is shown at *j*, and need not be described, because not new and not claimed.

The ribbon-box *f* is not, of course, claimed; but it may be well to specify that it can be made in any of the known forms which will admit of the co-operation of the parts hereinafter claimed as new.

*k* shows a lever set on the top of the fixed part *l* of the frame of the machine. It swings horizontally on its pivot *m*. It carries an arm, *n*, which works through proper guides. This arm works under the end of a spring-lever, *o*, the tendency of whose spring is to keep pressed downwardly the power end until checked by the stop *p*. The lever *o* is pivoted, as shown in the drawings, to the outer face of the plate *c*, and rises and falls with it. This lever *o* has a crook or elbow at the acting end thereof, whose office is, when properly adjusted, to press against the inside of the top end of the pivoted vertical arm *q*. This arm *q* has its pivot at *r*, and carries at its lower end a horizontally-placed knife, *s*. A spring, *t*, tends to keep the lower end of the arm *q* pushed outwardly, so that the ribbon will move along in the channel of the ribbon-box *f* without being touched by the cutting-edge of the knife *s*. The knife *s* moves in a guide, so as to make its motions uniform, and is pivoted to the bottom end of *q* at *v*. This, with the guides, makes the motion of the knife *s* horizontal and true.

It may be well to state that the ribbon is worked along through the box *f* in a well-known manner.

When the lever *k* is so turned that the arm *n* will not pass under the end of the arm *o*, then the plate *c* rises and falls and operates the knife *e*, but does not affect any operation by means of the lever *q* and the knife *s*. When the arm *n* is slipped under the end of the arm or lever *o*, then, as the plate *c* descends, the elbow of the arm *o* comes in contact with the inside of the top end of *q*. This throws in the knife *s* and forces it to cut from the top end of the peg a sufficient amount to make it of the desired length.

The lever *k* can be operated so as to slip the arm *n* under the lever *o* while the machine is in operation, and can also be so turned as to withdraw the arm *n* under the same circumstances.

The arm *q* is hung on and pivoted to an adjustable support, *w*, fixed at one side of the plate *c* to an immovable part of the frame of the machine. It has the slots and set-screws *x*. By means of these the support *w* can be moved up or down, as desired, and held at any desired adjustment. The support *w* carries an index, *y*, working over the scale *z*. The distance to which *w* and the arm *q* move can thus be determined by the scale.

It will be seen that as the arm *q* and the knife *s* are raised by the movement of *w* the pegs will be cut longer, and, when lowered, shorter.

The guides for the knife *s* are fast to the support *w*.

The ribbon-box *f*, in this form of pegging-machine, has a horizontal movement, produced by the movement of the block *d*, and by which the ribbon is worked through it as required to furnish the supply of pegs for the machine.

What I claim as my invention, and desire to secure by Letters Patent, is—

1. The combination, in a pegging-machine, of the knife *e*, to cut the pegs from the ribbon of peg-wood, and the knife *s*, whose cutting-edge is at right angles with the cutting-edge of knife *e*, for shortening the pegs, and the intermediate mechanism whereby the knife *s* is brought into action, as described, the knife *e* operating to cut a peg at each revolution of the machine, and the knife *s* operating only when the pegs are to be shortened.

2. The combination, in a pegging-machine as herein described, of the lever *k*, arm *n*, spring-lever *o*, plate *c*, vertical adjustable arm *q*, knife *s*, and spring *t*, to operate as herein described.

3. The combination of the knife *s*, arm *q*, support *w*, scales *z*, and index *y* with the lever *o* and plate *c*, as herein set forth.

T. H. FLETCHER.

Witnesses:

J. E. MAYNADIER,

J. S. HOLT.